Mar. 6, 1923.

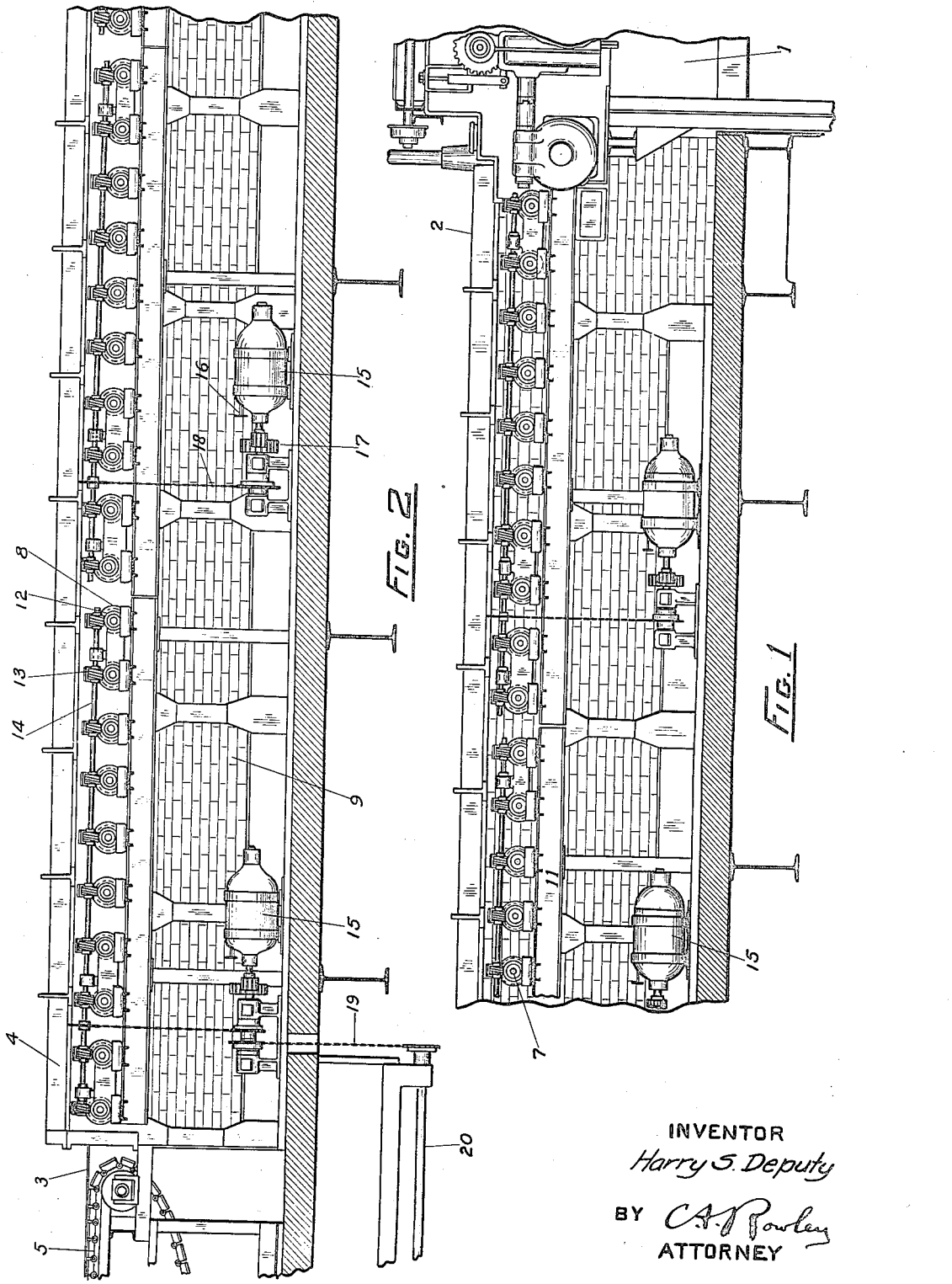

H. S. DEPUTY.
LEER CONVEYER.
FILED OCT. 13, 1920.

INVENTOR
Harry S. Deputy
BY C. H. Rowley
ATTORNEY

Patented Mar. 6, 1923.

1,447,649

UNITED STATES PATENT OFFICE.

HARRY S. DEPUTY, OF CHARLESTON, WEST VIRGINIA, ASSIGNOR TO THE LIBBEY-OWENS SHEET GLASS COMPANY, OF TOLEDO, OHIO, A CORPORATION OF OHIO.

LEER CONVEYER.

Application filed October 13, 1920. Serial No. 416,643.

*To all whom it may concern:*

Be it known that I, HARRY S. DEPUTY, a citizen of the United States, residing at Charleston, in the county of Kanawha and State of West Virginia, have invented new and useful Improvements in Leer Conveyers, of which the following is a specification.

This invention relates to a leer for annealing sheet glass, and more particularly to an improved conveying system for carrying a continuous sheet of glass through a long leer, or annealing oven, without unduly marring the surface of the sheet.

When sheet glass is drawn by the Colburn process, as shown for example in the patent to I. W. Colburn, 1,248,809, granted Dec. 4, 1917, the sheet is drawn vertically from a bath of molten glass, bent over a roller into a horizontal plane, and after emerging from the drawing mechanism, passes into a long annealing oven or leer wherein its temperature is gradually reduced from a substantially red heat until it is nearly cool. This leer is approximately 200 feet in length, and the sheet is carried throughout the leer on a series of driven rollers spaced at intervals of perhaps a foot. Obviously the exact length of the leer, or the number of supporting rollers used, is immaterial as far as this present invention is concerned, the above data being given merely to convey some idea as to the length of continuous glass sheet that is being constantly passed through the apparatus. In these leers, as at present constructed, the entire series of sheet supporting leer rollers is driven as a unit, either by gearing them directly to the sheet drawing machine, or by driving the entire series from a single motor. In this way all of the rollers are driven at the same peripheral speed. Now the sheet of glass will contract as it cools, and due to the extreme length of the sheet the amount of this contraction will be very appreciable from end to end of the leer, and will cause a material variation in the speeds at which the hotter and cooler ends of the continuous sheet are traveling. In other words, if the rollers are all driven at the same speed of rotation, and at such a speed as to conform exactly to the speed at which the hot glass is fed to them from the sheet drawing apparatus, the sheet as it cools and contracts will slow up so as to somewhat lag behind the rollers at the cool end of the leer. This will cause a relative movement between the sheet and the surface of some of the rollers, which tends to scratch and mar the fine fire polished surface of the drawn sheet. The object of this present invention is to so construct and drive the supporting rollers that their surface speeds will more approximately conform to the speed of the glass sheet at all points throughout the leer and thus avoid the marring effects above referred to.

The specific apparatus here used to accomplish this result will be more clearly understood from the following drawings and descriptions, wherein is disclosed a mechanism well adapted to carry out the invention.

In the accompanying drawings:

Fig. 1 is a side elevation of that end of the leer, (the hot end), adjacent the sheet drawing machine; also showing the driving mechanism for the leer rollers.

Fig. 2 is a view similar to Fig. 1, showing the cool end of the leer, from which the sheet passes out onto the cutting table. It is to be understood that between the two ends of the leer illustrated in Figs. 1 and 2, a long section of the leer is omitted. This portion is in all essential respects a duplication of the parts shown in these views.

Figure 3:
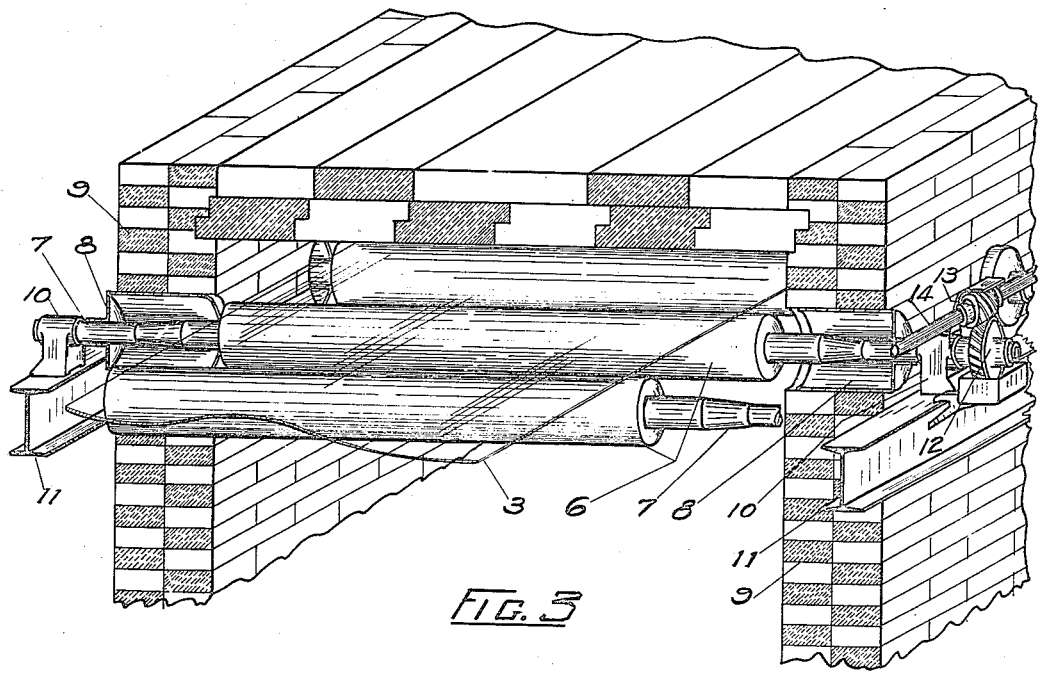
Fig. 3 is a perspective view including a vertical transverse section through the leer, illustrating a few of the sheet supporting rollers.

Referring first to Figs. 1 and 2, the delivery end of the sheet drawing machine is shown at 1, and 2 indicates generally the hot or intake end of the leer. The temperature inside the hotter end of the leer is maintained practically as high as at the exit end of the drawing machine, so that no sudden cooling of the glass can take place, and the temperature is gradually reduced toward the cooler end of the leer. This temperature regulation is maintained by suitable heating devices, usually gas flames, suitably distributed through the hotter portions of the leer.

After passing through the leer the sheet 3 emerges from the cool end 4 of the leer, onto the cutting table 5, whereon it is divided into suitable sheet sections. Throughout the length of the leer is a horizontal series of supporting rollers 6, (see Fig. 3), which are usually of metal with a suitable surface covering of clay or asbestos. The shaft 7 of each roller, at each end passes through suitable cover plates 8 in the walls 9 of the leer, and is journaled in bearing blocks 10, mounted on I-beams 11 at the outer sides of the leer. On one extended end of each shaft 7 is fixed a worm-wheel 12, meshing with and driven by a worm 13 keyed to a drive shaft 14. A single drive shaft 14 is geared up as described to a series of adjacent roller shafts 7, and in the old installation, before the adoption of the present invention, all of the shafts 14 were driven simultaneously, and at the same speed of rotation, from a common source of power, usually a parallel countershaft, being connected therewith by suitable sprocket-gearing.

In applying the present invention, each drive shaft 14, for a series of adjacent rollers, is separately and independently driven from its own variable speed motor. These motors 15, which are shown are electric motors each capable of being adjusted by hand wheel 16, to run continuously at the desired speed, are each connected through reduction gearing 17, and sprocket gearing 18, to one of the shafts 14. The motor 15 at the exit end of the leer, also drives, through sprocket gearing 19, a countershaft 20, which is connected through gearing, not shown, to the cutting table 5.

It will be noted from the above that the leer rollers 6 are divided into a longitudinal series of groups, each group being driven separately at a speed that may be adjusted in accordance with the speed of the glass sheet at that point. Of course, the theoretically ideal condition would be to have a separate drive for each individual roll, but practically, very satisfactory results may be obtained by using these motors at suitable intervals throughout the length of the leer. As shown in the drawings, each motor drives ten leer rollers, but this number is merely illustrative, as either more or less than ten can be driven in this manner. It will be understood that each motor is set at a slightly different speed, the fastest drive being at the hot end of the leer, and the slowest at the cold end.

Figure 4:
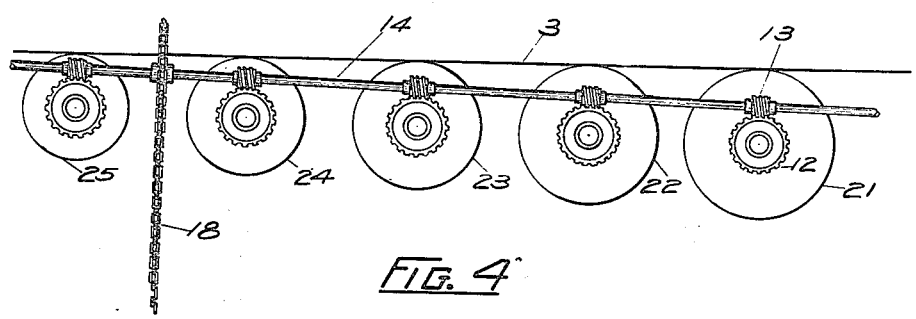
Fig. 4 is a diagrammatic view showing how the diameters of the rollers may be varied to carry out the principles of this invention.

In addition to the above, the system illustrated diagrammatically in Fig. 4 may be employed. In this figure, the series of rollers 21, 22, 23, 24, and 25, are of slightly decreasing diameters in the order as given. This change in diameter is greatly exaggerated in the drawings. The rollers are all driven, as before, at the same speed of rotation, from a common drive shaft 14. However, the speed of rotation being constant, the peripheral or surface speed will increase with the diameter, so that the large roller 21 will have a greater surface speed than the smaller roller 25. By using the larger rollers at the hotter end of the sheet and the smaller rollers toward the cooler end, and properly designing the size of the rollers, the surface speeds of the rollers may be made to conform very closely to the speed of the sheet at all points. If employed (as shown in Figs. 1 and 2) in connection with the group system first described above, the rollers throughout each group are varied in diameter from end to end of the group, and all of the groups may be duplicates, that is the large roller of one group be the same as the large roller of the next group and so on throughout the group. The same results might be obtained by varying the diameters of the rollers continuously from end to end of the leer, and using a single speed drive for all of the rollers.

The same results might be obtained by varying the speed ratios of the gearing between each roller shaft and the drive shaft 14, but this would usually be more difficult and less economical than varying the sizes of the rollers.

While this leer system has been designed especially for use with glass drawn by the so-called Colburn process, as stated above, it is in no wise limited to this type of drawing mechanism, but may be used with equal facility with any continuous sheet glass drawing mechanism wherein the glass sheet is passed through the leer before being divided into separate sheet sections.

I claim:

1. In a leer for continuous sheet glass, a series of parallel rollers for supporting and moving the sheet of glass through the leer, said rollers being all driven at the same speed of rotation from a common driving means, said rollers being of gradually decreasing diameters from the hotter to the cooler end of the series, so that their peripheral speeds will accord with the speed of the glass sheet as it contracts.

2. In a leer for continuous sheet glass, a series of parallel rollers for supporting and moving the sheet of glass through the leer, said rollers being arranged in a series of longitudinal groups, and a separate and independent variable speed driving means for each group which drives all the rollers in its group at the same speed of rotation, the rollers in each group being of gradually decreasing diameters from the hotter to the cooler end of the group.

Signed at Charleston, in the county of Kanawha and State of West Virginia, this 4th day of October, 1920.

HARRY S. DEPUTY.